(12) United States Patent
Kim

(10) Patent No.: US 9,791,675 B2
(45) Date of Patent: Oct. 17, 2017

(54) SUPER WIDE ANGLE LENS MODULE

(71) Applicant: SAMSUNG ELECTRO-MECHANICS CO., LTD., Suwon (KR)

(72) Inventor: Tae Young Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 13/676,673

(22) Filed: Nov. 14, 2012

(65) Prior Publication Data

US 2013/0128369 A1    May 23, 2013

(30) Foreign Application Priority Data

Nov. 22, 2011 (KR) .................. 10-2011-0122243

(51) Int. Cl.
*G02B 9/60* (2006.01)
*G02B 13/04* (2006.01)
*G02B 3/02* (2006.01)
*G02B 13/06* (2006.01)

(52) U.S. Cl.
CPC .............. *G02B 13/04* (2013.01); *G02B 3/02* (2013.01); *G02B 13/06* (2013.01)

(58) Field of Classification Search
CPC ...... G02B 13/18; G02B 9/60; G02B 13/0045; G02B 13/06; G02B 13/16; G02B 9/12; G02B 9/34; G02B 13/006
USPC ............... 359/659, 682, 713, 714, 750–753, 359/763–770, 671
See application file for complete search history.

(56) References Cited

U.S. PATENT DOCUMENTS

| | | | | |
|---|---|---|---|---|
| 3,645,605 | A * | 2/1972 | Nakagawa | 359/751 |
| 5,860,030 | A * | 1/1999 | Tada et al. | 396/72 |
| 7,298,561 | B1 * | 11/2007 | Yamashita | G02B 13/04 359/649 |
| 7,310,188 | B2 * | 12/2007 | Yamamoto et al. | 359/651 |
| 7,595,938 | B2 * | 9/2009 | Yamakawa | G02B 13/06 359/749 |
| 7,675,081 | B2 * | 3/2010 | Low et al. | 257/98 |
| 8,456,763 | B2 * | 6/2013 | Hsieh | G02B 9/62 359/753 |
| 2007/0236804 | A1 * | 10/2007 | Yamamoto | G02B 13/16 359/680 |
| 2008/0174887 | A1 | 7/2008 | Asami | |
| 2009/0251801 | A1 | 10/2009 | Jung et al. | |
| 2011/0122512 | A1 * | 5/2011 | Asami | 359/753 |
| 2011/0169912 | A1 * | 7/2011 | Abe et al. | 348/36 |

FOREIGN PATENT DOCUMENTS

JP    2008-176183    7/2008
KR    10-2009-0106242    10/2009

* cited by examiner

*Primary Examiner* — Scott J Sugarman
*Assistant Examiner* — Vipin Patel
(74) *Attorney, Agent, or Firm* — NSIP Law

(57) ABSTRACT

There is provided super wide angle lens module, including: a first lens having negative refractive power; a second lens having negative refractive power; a third lens having positive refractive power; a fourth lens having positive refractive power; and a fifth lens having positive refractive power and having a meniscus shape convex toward an image side, wherein the third lens satisfies Equation 1, Nd3>1.7    Equation 1 where Nd3 represents a refractive index of the third lens.

16 Claims, 4 Drawing Sheets

SUPER WIDE ANGLE LENS MODULE

CROSS-REFERENCE TO RELATED APPLICATIONS

This application claims the priority of Korean Patent Application No. 10-2011-0122243 filed on Nov. 22, 2011, in the Korean Intellectual Property Office, the disclosure of which is incorporated herein by reference.

BACKGROUND OF THE INVENTION

Field of the Invention

The present invention relates to a super wide angle lens module, and more particularly, to a super wide angle lens module that can minimize vignetting in an image projected onto an image sensor.

Description of the Related Art

A camera is generally used as a device for providing forward or rearward image information from a vehicle in the field of automotive engineering.

For example, a rearward facing camera may be installed in or on the rear of the vehicle (a trunk or a rear bumper) in order to image an object behind the vehicle and information with regard thereto may be provided to a driver. The rearward facing camera images an object which a vehicle operator may not be able to easily see when the vehicle reverses, to lessen the chance of the vehicle colliding with the object.

As another example, a forward facing camera may image a traffic situation in front of the vehicle to assist in determining a cause of an accident when a traffic accident occurs.

Such a monitoring camera includes a super wide angle lens module having a relatively wider angle of view than a general lens module to provide an image having a wide angle of view to a user (that is, a vehicle operator).

Since the super wide angle lens module is constituted of more lenses (for example, 7 or more) than general lens modules, a wide angle of view (for example, 180° or more) can be implemented.

However, in the super wide angle lens module, a distortion phenomenon may easily occur, due to the relatively large number of lenses and a vignetting phenomenon in which an edge of an image may be cut off.

SUMMARY OF THE INVENTION

An aspect of the present invention provides a super wide angle lens module that can ensure a wide angle of view with a relatively small number of lenses.

According to an aspect of the present invention, there is provided a super wide angle lens module, including: a first lens having negative refractive power; a second lens having negative refractive power; a third lens having positive refractive power; a fourth lens having positive refractive power; and a fifth lens having positive refractive power and having a meniscus shape convex toward an image side, wherein the third lens satisfies Equation 1, $$Nd3>1.7 \qquad \text{Equation 1}$$

where Nd3 represents a refractive index of the third lens.

The second lens, the fourth lens, and the fifth lens may be formed of a plastic material The second lens may satisfy Equation 2, and the fourth lens may satisfy Equation 3, $$50<V2<60 \qquad \text{Equation 2}$$

$$50<V4<60 \qquad \text{Equation 3}$$

where V2 represents a dispersion constant (abbe number) of the second lens, and V4 represents a dispersion constant of the fourth lens.

The super wide angle lens module may further include an stop disposed between the third lens and the fourth lens.

The stop may satisfy Equation 4, $$0 < \left| \frac{ds}{R51} \right| < 1.0 \qquad \text{Equation 4}$$

where ds represents a distance from the stop to an object-side surface of the fifth lens, and R51 represents a radius of curvature of the object-side surface of the fifth lens.

At least one surface of the second lens, the fourth lens, and the fifth lens may be aspherical.

The first lens may have a meniscus shape convex toward an object side.

The second lens may have an image-side surface having a concave shape.

The fourth lens may have an image-side surface having a convex shape.

The first lens may have an object-side surface having a constant curve, including an edge thereof.

The super wide angle lens module may further include a lens housing including the first to fifth lenses, and the first lens may be disposed such that an object-side surface of the first lens is completely exposed to the outside of the lens housing.

The first lens may include a protrusion protruding toward the image side, and the lens housing may include a groove into which the protrusion fits.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings.

In describing the present invention below, terms indicating components of the present invention are named in consideration of functions thereof. Therefore, the terms should not be understood as limiting technical components of the present invention.

Figure 1:
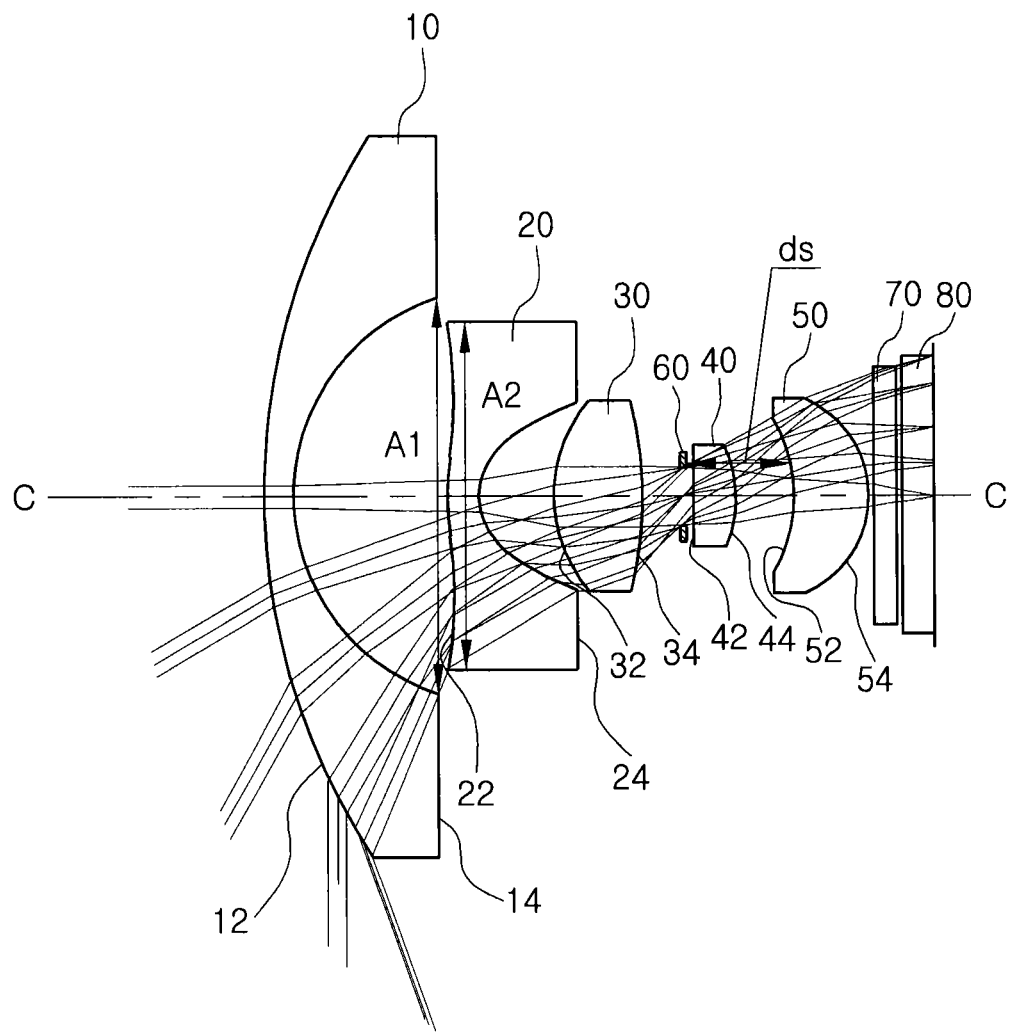
FIG. 1 is a cross-sectional view of a lens module according to a first embodiment of the present invention.
Figure 2:
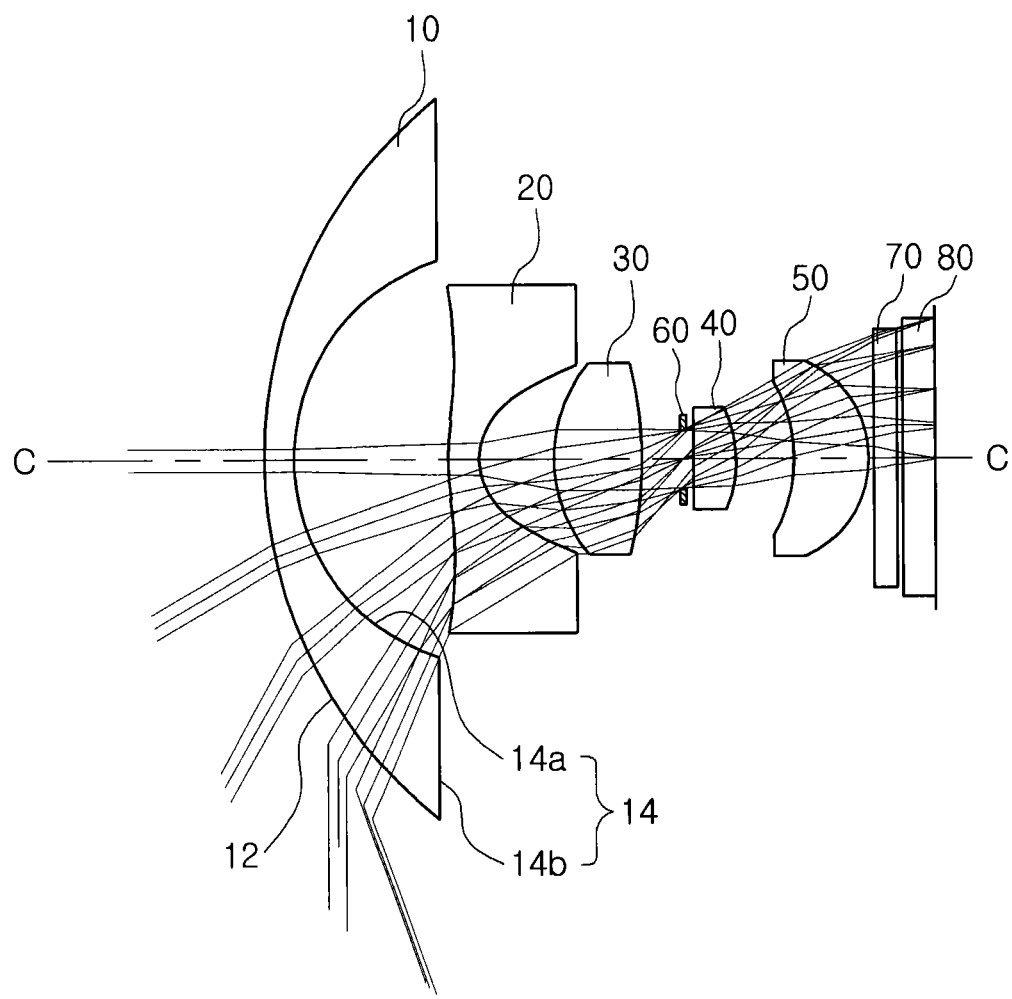
FIG. 2 is a cross-sectional view of a lens module according to a second embodiment of the present invention.
Figure 3:
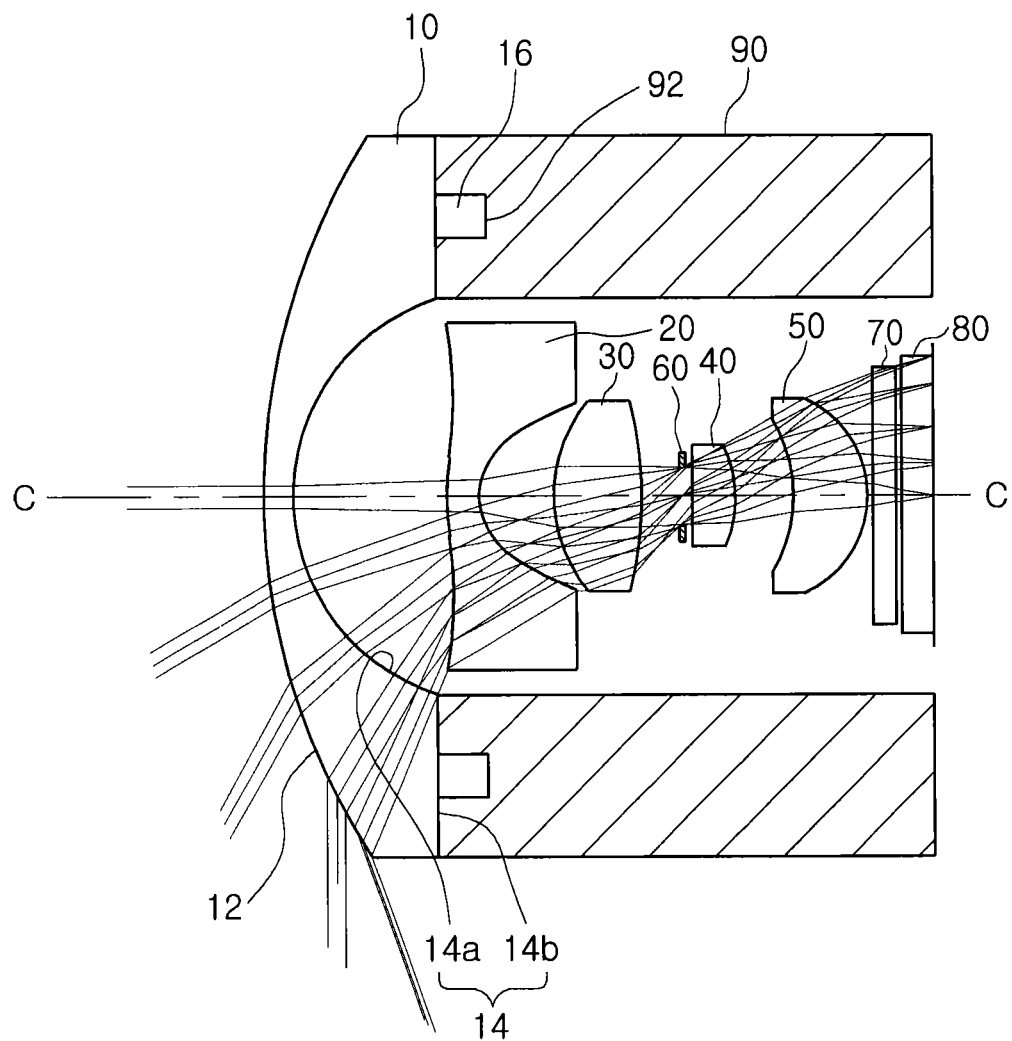
FIG. 3 is a cross-sectional view of a lens module according to a third embodiment of the present invention.
Figure 4:
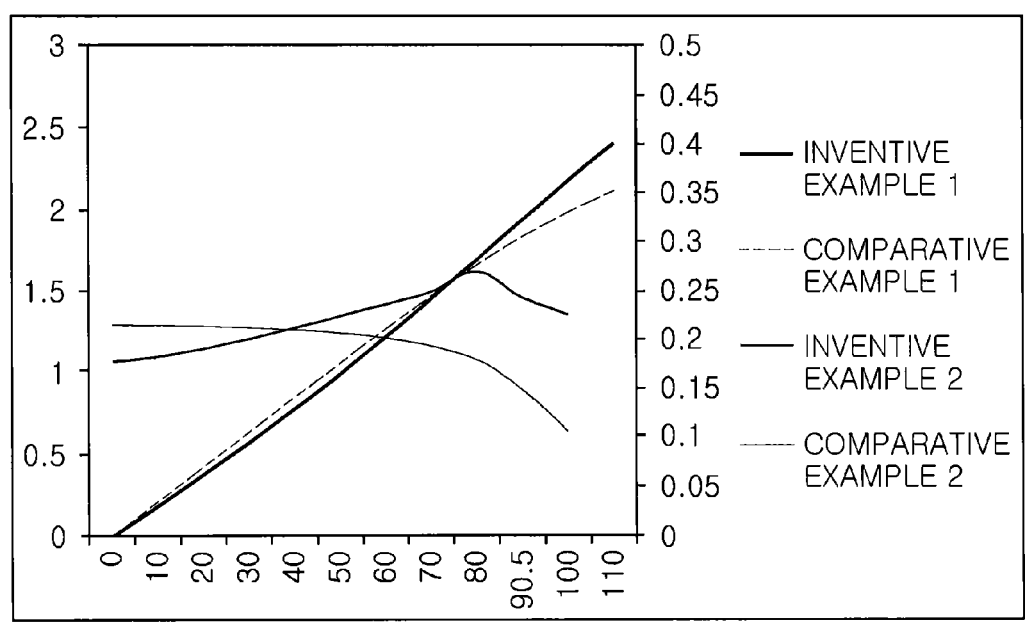
FIG. 4 is a graph illustrating a height difference in an image surface with regard to an angle of view.

FIG. 1 is a cross-sectional view of a lens module according to a first embodiment of the present invention, FIG. 2 is a cross-sectional view of a lens module according to a second embodiment of the present invention, FIG. 3 is across-sectional view of a lens module according to a third embodiment of the present invention, and FIG. 4 is a graph illustrating a height difference in an image surface with regard to an angle of view.

A super wide angle lens module 100 according to the first embodiment of the present invention includes a first lens 10, a second lens 20, a third lens 30, a fourth lens 40, and a fifth lens 50 and may further selectively include an stop 60 and a filter member 70. Herein, the first to fifth lenses 10, 20, 30, 40, and 50 may be sequentially placed from an object side (that is, a subject for photography or an imaging target) to an image side (that is, an image sensor).

All of the first lens 10, the second lens 20, the third lens 30, the fourth lens 40, and the fifth lens 50 may be formed of a plastic material. Like this, when all the lenses 10, 20, 30, 40, and 50 forming the lens module 100 are formed of the plastic material, manufacturing costs of the lens module 100 maybe reduced and mass production thereof maybe facilitated.

In particular, when the lenses 10, 20, 30, 40, and 50 are formed of the plastic material, lens surfaces thereof may easily be processed. Therefore, the lens surfaces of the lenses 10, 20, 30, 40, and 50 may be formed as spherical or aspherical surfaces.

The first lens 10 may be placed to be closest to the object in the super wide angle lens module 100. The first lens 10 may have negative refractive power. More specifically, in the first lens 10, a first surface (an object-side surface) 12 may be convex toward the object side and a second surface (an image-side surface) 14 may be concave toward the image side. More specifically, the first lens 10 may have a cross-sectional shape in which the thickness of the first lens 10 is reduced toward an optical axis (line C-C) from the edge thereof.

The first lens 10 may have a relatively larger size than the other lenses 20, 30, 40, and 50. More specifically, an effective area A1 of the second surface 14 of the first lens 10 may be larger than an effective area A2 of a first surface 22 of the second lens 20.

The shape of the first lens 10 may assist in the incidence of light, incident through the first lens 12 and the second surface 14 of the first lens 10, to the first surface 22 of the second lens 20. Accordingly, a wide angle of view may be ensured.

The first lens 10 may have a meniscus shape which is convex toward the object side. Moreover, at least one of the first surface 12 and the second surface 14 of the first lens 10 may be aspherical. However, both the first surface 12 and the second surface 14 may be aspherical as necessary.

The second lens 20 may be placed in the rear (in the image-side direction) of the first lens 10. The second lens 20 may have negative refractive power and may be formed of a plastic material like the first lens 10.

The first surface (object-side surface) 22 of the second lens 20 may have a concave shape and the second surface (image-side surface) 24 thereof may have a concave shape. However, the first surface 22 of the second lens 20 may be a flat plane as necessary. Alternatively, the first surface 22 of the second lens 20 may be convex on the optical axis and be concave toward the edge thereof as shown in FIG. 1.

The second lens may have at least one aspherical surface. For example, at least one of the first surface 22 and the second surface 24 of the second lens 20 may be aspherical. However, both the first surface 22 and the second surface 24 may be aspherical according to a type of the super wide angle lens module 100 to be manufactured.

The second lens 20 may have a dispersion constant (abbe number) that satisfies Equation 2.

$$50 < V2 < 60 \qquad \text{Equation 2}$$

(Here, V2 represents a dispersion constant (abbe number) of the second lens.)

When the dispersion constant of the second lens 20 is larger than 50, the chromatic aberration of the super wide angle lens module 100 may be effectively improved. However, when the dispersion constant of the second lens 20 is larger than 60, it is difficult to manufacture the second lens 20, and the dispersion constant of the first lens 10 also needs to be increased, and accordingly, manufacturing costs of the super wide angle lens module 100 may increase.

Accordingly, in the case in which the dispersion constant of the second lens 20 satisfies the numerical range presented in Equation 1, it is useful in the manufacturing of the super wide angle lens module 100.

The third lens 30 may be placed in the rear (in the image-side direction) of the second lens 20. The third lens 30 may have positive refractive power and may be formed of a plastic material like the first lens 10.

A first surface (object-side surface) 32 of the third lens 30 may have a convex shape toward the object side and a second surface (image-side surface) 34 thereof may have a concave shape toward the image side. Specifically, the first surface 32 of the third lens 30 may be more convex than the second surface 34 thereof (that is, a radius of curvature of the first surface 32 may be smaller than a radius of curvature of the second surface 34).

The third lens 30 may have at least one aspherical surface. For example, at least one of the first surface 32 and the second surface 34 of the third lens 30 may be aspherical. However, both the first surface 32 and the second surface 34 may be aspherical according to the type of the super wide angle lens module 100 to be manufactured.

The third lens 30 may have a dispersion constant smaller than that of the second lens 20. For example, the third lens 30 may have a dispersion constant of 40 or less and as necessary, may have a dispersion constant of 20 or less. As such, when the dispersion constant of the third lens 30 is smaller than the dispersion constant of the second lens 20, it may be more effective to improve the chromatic aberration. A difference between the dispersion constant of the third lens 30 and the dispersion constant of the second lens 20 may be 20 or more, but 20 or less as necessary.

The third lens 30 may have refractive index that satisfies Equation 1. That is, the refractive index of the third lens 30 may be greater than 1.7.

$$Nd3 > 1.7 \qquad \text{Equation 1}$$

(Here, Nd3 represents the refractive index of the third lens 30.)

When the refractive index of the third lens 30 satisfies Equation 1 as above, an overall length (a length from the first lens 10 to an image sensor 80 or a length from the first lens 10 to the fifth lens 50) of the super wide angle lens module 100 may be minimized.

Accordingly, the numerical range according to Equation 1 may be used as an important condition to determine the size of the super wide angle lens module 100.

Unlike this, when the refractive index of the third lens 30 is 1.7 or less, the overall length of the super wide angle lens module 100 may be extended and the thickness of the third lens 30 maybe increased. Moreover, when the refractive index of the third lens 30 is 1.7 or less, the amount of light passing through the third lens 30 is significantly reduced, and as a result, the resolution of the super wide angle lens module 100 may be deteriorated.

Meanwhile, although not present in Equation 1, an upper limit of the refractive index of the third lens 30 may be determined according to a material of the third lens 30. For example, when the third lens 30 is formed of a plastic material, the refractive index of the third lens 30 may be lower than that when the third lens 30 is formed of a glass material.

The fourth lens 40 may be placed in the rear (in the image-side direction) of the third lens 30. The fourth lens 40 may have positive refractive power and may be formed of a plastic material like the first lens 10.

A first surface (object-side surface) 42 of the fourth lens 40 may have a flat or concave shape and a second surface (image-side surface) 44 thereof may have a convex shape toward the image side.

The fourth lens 40 may have at least one aspherical surface. For example, at least one of the first surface 42 and the second surface 44 of the fourth lens 40 may be aspherical. However, both the first surface 42 and the second surface 44 may be aspherical according to the type of the super wide angle lens module 100 to be manufactured.

The fourth lens 40 may have a dispersion constant larger than that of the third lens 30. For example, the fourth lens 40 may have a dispersion constant of 50 or less. Specifically, the dispersion constant of the fourth lens 40 may have a numerical range that satisfies Equation 3. More specifically, the dispersion constant of the fourth lens 40 may have the same or similar numerical range as that of the dispersion constant of the second lens 20.

$$50 < V4 < 60 \quad \text{Equation 3}$$

(Here, V4 represents the dispersion constant of the fourth lens.)

When the dispersion constant of the fourth lens 40 is larger than 50, the dispersion constant of the fourth lens 40 has a relatively large deviation from the dispersion constant of the third lens 30, and as a result, it may be effective to improve the chromatic aberration of the super wide angle lens module 100.

However, when the dispersion constant of the fourth lens 40 is larger than 60, it may be difficult to manufacture the fourth lens 40, and as a result, the dispersion constant of the fourth lens 40 may be within the numerical range of Equation 3. More specifically, the dispersion constant of the fourth lens 40 may be equal to the dispersion constant of the second lens 20. In this case, the improvement effect of the chromatic aberration through the second lens 20, the third lens 30, and the fourth lens 40 may be maximized, and the second lens 20 and the fourth lens 40 may be formed of the same material.

The fifth lens 50 may be placed to be closest to the image in the super wide angle lens module 100. The fifth lens 50 may have positive refractive power. More specifically, in the fifth lens 50, a first surface (an object-side surface) 52 may have a concave shape and a second surface (an image-side surface) 54 thereof may be a convex shape toward the image side. More specifically, the fifth lens 50 may have a cross-sectional shape in which the thickness of the fifth lens 50 may be thicker on the optical axis than in the edge of the fifth lens 50. Moreover, the fifth lens 50 may have a relatively larger size than the fourth lens 40.

The shape of the fifth lens 50 may be suitable to project light incident through the fourth lens 40 to the image sensor 80. Accordingly, vignetting in the image projected onto the image sensor may be suppressed.

The fifth lens 50 may have a meniscus shape which is convex toward the image side. The meniscus-shaped fifth lens 50 may reduce an incident angle of light so as to prevent light incident in the image sensor 80 from being distorted.

The fifth lens 50 may have at least one aspherical surface. For example, at least one of the first surface 52 and the second surface 54 of the fifth lens 50 may be aspherical. However, both the first surface 52 and the second surface 54 may be aspherical as necessary.

The stop 60 may be placed between the third lens 30 and the fourth lens 40. The stop 60 may control the amount of light incident through the third lens 30.

The stop 60 may be formed integrally with the third lens 30 and the fourth lens 40. For example, the stop 60 may include a light shielding film formed on the second surface 34 of the third lens 30 or on the first surface 42 of the fourth lens 40.

In this case, the stop 60 may be covered with black ink or the light shielding film.

Meanwhile, the stop 60 may satisfy Equation 4. That is, a distance ds from the stop 60 to the first surface 52 of the fifth lens 50 may be determined by a radius of curvature R51 of the first surface 52 of the fifth lens 50.

That is, the distance ds may be increased when the radius of curvature R51 of the first surface 52 of the fifth lens 50 is increased and may be reduced when the radius of curvature R51 of the first surface 52 of the fifth lens 50 is reduced.

$$0 < \left| \frac{ds}{R51} \right| < 1.0 \quad \text{Equation 4}$$

(Here, ds represents the distance from the stop to the first surface of the fifth lens, and R51 represents the radius of curvature of the first surface of the fifth lens.)

However, when the distance ds is equal to or greater than the radius of curvature R51 of the first surface 52, the overall length of the super wide angle lens module 100 may be significantly extended. Accordingly, when the distance ds is less than the radius of curvature R51, it is effective in miniaturizing the super wide angle lens module 100.

The filter member 70 may be placed between the fifth lens 50 and the image sensor 80.

The filter member 70 may be an IR filter blocking infrared rays and may be formed of a glass material. Further, the filter member 70 may be integrally formed with the image sensor 80. Moreover, the filter member 70 may be omitted according to use of the super wide angle lens module 100.

The image sensor 80 may be mounted in an apparatus on which the lens module 100 is to be mounted, or in a housing receiving the plurality of lenses 10, 20, 30, 40, and 50.

The image sensor 80 may receive an image of an object through light reflected therefrom incident through the lenses 10, 20, 30, 40, and 50. The image sensor 80 may be a CCD or a CMOS and may be formed as a chip scale package (CSP).

Unlike the related art, since the super wide angle lens module 100 according to the present embodiment is constituted of 5 lenses, the super wide angle lens module 100 may be miniaturized. Moreover, in the super wide angle lens module 100 according to the present embodiment, since the dispersion constants of the second lens 20 and the fourth lens 40 are larger than the dispersion constant of the third lens 30, chromatic aberration may be improved while a wide angle of view is ensured.

Next, a lens module according to a second embodiment of the present invention will be described with reference to FIG. 2.

The super wide angle lens module 100 according to the second embodiment may be distinguished from that of the first embodiment in terms of the shape of the first lens 10. That is, the first surface 12 and the second surface 14 of the first lens 10 may be connected to each other in the super wide angle lens module 100 according to the second embodiment of the present invention.

The first surface 12 may be a curved surface having a predetermined radius of curvature. More specifically, the first surface 12 may have an aspherical shape in which a curvature of a part through which an optical axis passes is different from that of an edge part.

The second surface 14 may include a curved portion 14a having a predetermined radius of curvature and a flat portion 14b. The curved portion 14a may be formed in a central portion of the second surface 14 and may have a radius of curvature relatively smaller than the radius of curvature of the first surface 12. Unlike this, the flat portion 14b may be formed at an edge portion of the curved portion 14a and may be connected to the first surface 12.

The first lens 10 may have a cross section in which the first lens is thinner in a part through which the optical axis passes than in the edge portion of the first lens. Moreover, since the first surface 12 and the flat portion 14b of the second surface 14 are connected to each other, light incident in a lateral direction of the first lens 10 may pass through the first surface 12.

Accordingly, in the first lens 10 according to the present embodiment, since light reflected from things around an object may be ensured, an angle of view of the super wide angle lens module 100 may be more effectively expanded.

Next, a lens module according to a third embodiment of the present invention will be described with reference to FIG. 3.

The super wide angle lens module 100 according to the third embodiment may be distinguished from the above-mentioned embodiments in terms of the shape of the first lens 10. That is, the super wide angle lens module 100 shown in FIG. 3 may include a first lens 10 having a protrusion 16 and a housing 90 having a groove 92.

The first lens 10 may include the protrusion 16 protruding toward the image side (that is, toward the image sensor).

The protrusion 16 may be formed on the flat portion 14b in which an effective amount of light (light reflected from a target object to be imaged) is not incident. The protrusion 16 may have a constant circular shape centered around an optical axis (line C-C) or a segmented pillar shape centered around the optical axis.

The housing 90 may have the groove 92 corresponding to the protrusion 16. The size of the groove 92 may be enough to fully receive the protrusion 16. To this end, a cross-sectional size of the groove 92 maybe larger than that of the protrusion 16. Herein, a spare space generated after the coupling of the groove 92 and the protrusion 16 may be filled with an adhesive.

In the super wide angle lens module 100, since the first lens 10 and the housing 90 are coupled to each other through the protrusion 16 and the groove 92, the edge portion of the first lens 10 may be exposed to the outside, and as a result, an effective amount of light reflected from the object may be ensured to be incident.

Tables 1 to 5 show numerical values with regard to various Examples of the super wide angle lens module 100 having the above-described configuration. For reference, Tables 1 and 2 are numerical values according to Inventive Example 1, and Tables 3 and 4 are numerical values according to Inventive Example 2. In addition, Table 5 is a calculation value of Equation 4 with regard to Examples 1 and 2.

TABLE 1

| Surface No. | Radius of Curvature | Thickness or Distance | Glass code |
|---|---|---|---|
| 1 | 10.94849 | 0.500000 | 736.454 |
| 2 | 3.49580 | 2.715208 | |
| *3 | 15.34561 | 0.500000 | 534.557 |
| *4 | 1.00821 | 1.297475 | |
| 5 | 2.34309 | 1.497443 | 755.275 |
| 6 | −7.61563 | 0.748772 | |
| Stop | INFINITY | 0.171813 | |
| *8 | −982.07886 | 0.721722 | 534.557 |
| *9 | −2.13592 | 0.986787 | |
| *10 | −4.51849 | 1.276159 | 534.557 |
| *11 | −1.27699 | 0.100000 | |
| 12 | INFINITY | 0.400000 | 516.641 |
| 13 | INFINITY | 0.100000 | |
| 14 | INFINITY | 0.550000 | 516.641 |
| 15 | INFINITY | 0.118942 | |

In Table 1, the dispersion constant of the first lens was 45.4, smaller than those of the second and fourth lenses.

Each of the dispersion constants of the second and fourth lenses was 55.7, satisfying the numerical values presented in Equations 1 and 3.

The third lens had a dispersion constant of 27.5, smaller than those of the second and fourth lenses in order to improve chromatic aberration.

However, since the fifth lens did not affect the improvement of the chromatic aberration, the fifth lens had the same dispersion constant (55.7) as those of the second and fourth lenses.

The refractive index of the third lens was 1.75, satisfying Equation 2.

A value of |ds/R51| representing the relationship between the stop and the fifth lens was 0.42 (see Table 5), satisfying Equation 4.

In Inventive Example 1 as described above, although an angle of view (X axis) increases, a difference in height is not significantly decreased due to distortion of light, unlike those of the Comparative Examples as shown in FIG. 4, and as a result, the vicinity of the object may be effectively imaged.

Table 2 shows numerical values for calculating aspherical coefficients of the lenses according to Inventive Example 1, and Equation 5 uses the numerical values thereof.

TABLE 2

| Surface No. | K | A | B | C | D | E |
|---|---|---|---|---|---|---|
| 3 | 10.000000 | −.743842E−02 | 0.524045E−03 | −.350278E−04 | 0.143088E−05 | |
| 4 | −0.781381 | 0.209206E−01 | 0.144688E−01 | −.576358E−02 | 0.568103E−03 | |

TABLE 2-continued

| Surface No. | K | A | B | C | D | E |
|---|---|---|---|---|---|---|
| 8 | −982.07886 | −.193149E−01 | −.817574E−01 | −.938745E−01 | 0.168824E+00 | |
| 9 | 0.000000 | 0211042E−01 | −.848818E−02 | −.115809E−01 | −.213025E−01 | |
| 10 | −27.815449 | −.848356E−01 | −.328496E−02 | 0.803215E−2 | −.644432E−03 | |
| 11 | −0.000000 | 0.246656E−01 | −.167851E−01 | −.232190E−02 | 0.133101E−02 | 0.155760E−03 |

$$Z = \frac{Cr^2}{1+\sqrt{1-(1+k)c^2r^2}} + Ar^4 + Br^6 +$$
$$Cr^8 + Dr^{10} + Er^{12} + Fr^{14} + Gr^{16} + Hr^{18} + Jr^{20}$$

Equation 5

In Equation 5, C represents a curvature (1/r), K represents a conic constant, and r represents a radius of curvature. Moreover, constants A to J represent $4^{th}$ to $20^{th}$ aspherical coefficients. In addition, Z represents a sag at a predetermined position.

TABLE 3

| Surface No. | Radius of Curvature | Thickness or Distance | Glass code |
|---|---|---|---|
| 1 | 10.75094 | 0.500000 | 672.519 |
| 2 | 3.44068 | 2.540762 | |
| *3 | 11.53410 | 0.500000 | 534.557 |
| *4 | 0.84232 | 1.068837 | |
| 5 | 1.68190 | 1.460719 | 755.275 |
| 6 | −15.40144 | 0.356907 | |
| Stop | INFINITY | 0.291343 | |
| *8 | 35.63597 | 0.889986 | 534.557 |
| *9 | −2.32316 | 0.490450 | |
| *10 | −43.41609 | 1.093584 | 534.557 |
| *11 | −1.87276 | 0.100000 | |
| 12 | INFINITY | 0.400000 | 516.641 |
| 13 | INFINITY | 1.000000 | |
| 14 | INFINITY | 0.550000 | 516.641 |
| 15 | INFINITY | 0.242643 | |

In Table 3, the dispersion constant of the first lens was 51.9, smaller than those of the second and fourth lenses.

Each of the dispersion constants of the second and fourth lenses was 55.7, satisfying the numerical values presented in Equations 1 and 3.

The third lens had a dispersion constant of 27.5, smaller than the second and fourth lenses in order to improve chromatic aberration.

However, since the fifth lens did not affect the improvement of the chromatic aberration, the fifth lens had the same dispersion constant (55.7) as those of the second and fourth lenses.

The refractive index of the third lens was 1.75, satisfying Equation 2.

A value of $|ds/R51|$ representing the relationship between the stop and the fifth lens was 0.04 (see Table 5), satisfying Equation 4.

In Inventive Example 2 as described above, although the angle of view (X axis) increases, a difference in height is not significantly decreased due to distortion of light, unlike those of Comparative Examples as shown in FIG. 4, and as a result, the vicinity of the object may be effectively imaged as in Inventive Example 1.

Table 4 shows numerical values for calculating aspherical coefficients of the lenses according to Inventive Example 2.

TABLE 4

| Surface No. | K | A | B | C | D | E |
|---|---|---|---|---|---|---|
| 3 | 10.000000 | −.810011E−02 | 0.628918E−03 | −.449682E−04 | 0.103617E−05 | |
| 4 | −0.763623 | 0.295846E−01 | 0.646521E−02 | −.605398E−03 | 0.401780E−02 | |
| 8 | 0.000000 | −.129767E+00 | −.780820E−01 | 0.313971E−01 | −.100749E+00 | |
| 9 | 0.000000 | −.441848E−02 | −.482535E−01 | −718921E−02 | −.387648E−02 | |
| 10 | 702.228285 | 0.962675E−02 | −.175514E−01 | 0.200825E−02 | 0.926691E−03 | |
| 11 | −1.000000 | 0.418867E−01 | −.140016E−01 | −.251153E−03 | 0.123335E−02 | −.135365E−03 |

TABLE 5

| Equation | Example 1 | Example 2 |
|---|---|---|
| $|ds/R51|$ | 0.4161 | 0.038 |
| V2 | 55 | 55 |
| V4 | 55 | 55 |

As set forth above, according to the embodiments of the present invention, there is provided a lens module having an angle of view of 180° or more with a small number of lenses.

While the present invention has been shown and described in connection with the embodiments, it will be apparent to those skilled in the art that modifications and variations can be made without departing from the spirit and scope of the invention as defined by the appended claims.

What is claimed is:

1. A super wide angle lens module, comprising:
a first lens having negative refractive power, and being placed to be closest to the object in the super wide angle lens module;
a second lens having negative refractive power and having an object-side surface being a convex shape;
a third lens having positive refractive power and having a convex object-side surface and a convex image-side surface;
a fourth lens having positive refractive power; and
a fifth lens having positive refractive power and having an object-side surface being a concave shape and an image-side surface being a convex shape,
wherein the lens module comprises a maximum number of five lenses.

2. The super wide angle lens module of claim 1, wherein the second lens, the fourth lens, and the fifth lens are formed of a plastic material.

3. The super wide angle lens module of claim 1, wherein the second lens satisfies Equation 2, and
the fourth lens satisfies Equation 3, $$50<V2<60 \quad \text{Equation 2}$$

$$50<V4<60 \quad \text{Equation 3}$$

where V2 represents a dispersion constant (abbe number) of the second lens, and V4 represents a dispersion constant of the fourth lens.

4. The super wide angle lens module of claim 1, further comprising a stop disposed between the third lens and the fourth lens.

5. The super wide angle lens module of claim 4, wherein the stop satisfies Equation 4, $$0 < \left| \frac{ds}{R51} \right| < 1.0 \quad \text{Equation 4}$$

where ds represents a distance from the stop to the object-side surface of the fifth lens, and R51 represents a radius of curvature of the object-side surface of the fifth lens.

6. The super wide angle lens module of claim 1, wherein at least one surface of the second lens, the fourth lens, and the fifth lens is aspherical.

7. A super wide angle lens module, comprising:
a first lens having negative refractive power, and being placed to be closest to the object in the super wide angle lens module;
a second lens having negative refractive power;
a third lens having positive refractive power and having a convex object-side surface and a convex image-side surface;
a fourth lens having positive refractive power; and
a fifth lens having positive refractive power and having an object-side surface being a concave shape and an image-side surface being a convex shape,
wherein the lens module comprises a maximum number of five lenses.

8. The super wide angle lens module of claim 1, wherein the second lens has an image-side surface having a concave shape.

9. The super wide angle lens module of claim 1, wherein the fourth lens has an image-side surface having a convex shape.

10. The super wide angle lens module of claim 1, wherein the first lens has an object-side surface having a constant curve, including an edge thereof.

11. The super wide angle lens module of claim 1, further comprising a lens housing including the first to fifth lenses,
wherein the first lens is disposed such that an object-side surface of the first lens is completely exposed to the outside of the lens housing.

12. The super wide angle lens module of claim 11, wherein the first lens includes a protrusion protruding away from the object-side surface of the first lens, and
the lens housing includes a groove into which the protrusion fits.

13. The super wide angle lens module of claim 1, wherein the super wide angle lens module includes only the first lens, second lens, third lens, fourth lens, and fifth lens and no other lenses.

14. The super wide angle lens module of claim 1, further comprising an image sensor that is located on a same side as the image-side surface of the fifth lens, and
wherein the image sensor is configured to capture an image of an object that is located on the object-side surface of the fifth lens.

15. The super wide angle lens module of claim 1,
wherein the first lens and the second lens are not in contact with each other, and
wherein only an air gap is located between the third lens and the fourth lens.

16. The super wide angle lens module of claim 1,
wherein the first lens and the second lens are not in contact with each other, and
wherein the second lens and the third lens are not in contact with each other.

* * * * *